UNITED STATES PATENT OFFICE.

WILLIAM VAN WYCK, OF NEW YORK, N. Y., ASSIGNOR TO ELIAS W. VAN VOORHIS, OF SAME PLACE.

PURIFYING AND BLEACHING WAX.

Specification forming part of Letters Patent No. 38,540, dated May 12, 1863.

*To all whom it may concern:*

Be it known that I, WILLIAM VAN WYCK, of the city, county, and State of New York, have invented a new and useful Improvement in Bleaching Beeswax; and I do hereby declare that the following is a full, clear, and exact description of the same.

The nature of my invention consists in a new and improved process for purifying and bleaching beeswax. My process is as follows: I prepare a vessel, of suitable material, as iron, clay, &c., and of a form proper for a filter. This vessel is to be so erected as to be capable of being heated, and I find a steam-jacket to answer the purpose. The filter is now to be charged with bone-charcoal or equivalent discoloring materials, and it is best to heat this material first. The steam heat being also applied to the vessel, the crude wax is to be thrown in, and as soon as it becomes fluid by the heat it will pass through the bone-black and be discharged at the bottom into a receiver. The wax is to be continuously applied until the decoloring property of the bone-black or other agent employed is exhausted. In case the wax has not become perfectly white by once passing through, it must be submitted to the action of a fresh filter and sufficiently often to effect the desired result. In general, the above process will suffice; but in case there is still found color remaining after passing through the filter I proceed as follows: I render the wax fluid by the aid of a solvent of it—that is to say, I form a solution of wax and derosinized turpentine, and then treat the solution in the filter as already described, except that care must be taken to keep the temperature of the filter below the boiling-point of water. The liquor will be discharged perfectly colorless, and the process is completed by separating the wax from its solvent by any of the usual methods known to chemists. Of course care will be taken to recover the solvent also for use again. At the end of an operation, especially when the wax is filtered alone, there will be a considerable quantity remaining in contact with the bone-black and the filter. This may be dissolved out by the use of a solvent and the wax recovered, as already described. This wax will contain all the impurities and coloring-matter collected from the whole mass treated, and will therefore be a very gross product; but it can nevertheless be perfectly purified and bleached.

I claim—

The process herein described of purifying and bleaching wax—that is to say, first liquefying the wax, and while in that condition submitting it in a filter to the action of bone-black or other suitable decoloring material.

In witness whereof I have hereunto set my hand.

WILLIAM VAN WYCK.

Witnesses:
   N. H. HUSTIS,
   WILLIS VAN LINE.